US005872438A

United States Patent [19]
Roston

[11] Patent Number: 5,872,438
[45] Date of Patent: Feb. 16, 1999

[54] WHOLE-BODY KINESTHETIC DISPLAY

[75] Inventor: Gerald Roston, Whitmore Lake, Mich.

[73] Assignee: Cybernet Systems Corporation, Ann Arbor, Mich.

[21] Appl. No.: 886,315

[22] Filed: Jul. 1, 1997

Related U.S. Application Data

[63] Continuation of Ser. No. 543,606, Oct. 16, 1995, Pat. No. 5,629,594, which is a continuation-in-part of Ser. No. 257,070, Jun. 9, 1994, Pat. No. 5,459,382, which is a division of Ser. No. 984,324, Dec. 2, 1992, Pat. No. 5,389,865.

[60] Provisional application No. 60/021,151, Jul. 1, 1996.

[51] Int. Cl.$^6$ .............................. F41A 33/00; A63B 24/00
[52] U.S. Cl. ................................ 318/568.11; 318/568.1; 318/568.12; 434/11; 434/255; 482/4
[58] Field of Search .................................... 318/560–696; 364/559, 560, 474.03, 474.37, 551.02, 190, 461; 395/124, 155, 93, 161, 99, 127; 434/11, 255, 112, 365, 116, 247; 340/407.1, 407.2, 825.19, 680

[56] References Cited

U.S. PATENT DOCUMENTS

| | | | |
|---|---|---|---|
| 5,429,140 | 7/1995 | Burdea et al. | 128/774 |
| 5,451,924 | 9/1995 | Massimino et al. | 340/407.1 |
| 5,461,711 | 10/1995 | Wang et al. | 395/161 |
| 5,524,637 | 6/1996 | Erickson | 128/779 |
| 5,548,694 | 8/1996 | Frisken Gibson | 395/124 |
| 5,577,981 | 11/1996 | Jarvik | 482/4 |
| 5,580,249 | 12/1996 | Jacobsen et al. | 434/11 |
| 5,619,180 | 4/1997 | Massimino et al. | 340/407.1 |
| 5,691,898 | 11/1997 | Rosenberg et al. | 364/190 |
| 5,694,013 | 12/1997 | Stewart et al. | 318/561 |
| 5,724,264 | 3/1998 | Rosenberg et al. | 364/559 |

OTHER PUBLICATIONS

Adelstein, B.D. and Rosen M.J. "Design and Implementation of force reflecting manipulandum for manual control research," pp. 1–12 in M. Kazerooni, eds., ASME 1992, *Advances in Robotics* DSC vol. 42., 1992.

Tan, H.Z., Srinvasan, M.A., Eberman, B. and Cheng, B. "Human Factor for the Design of Force–Reflecting Haptic Interfaces," Proceedings of the ASME Winter Annual Meeting, Symposium on Haptic Interfaces for Virtual Environment and Teleoperator Systems, Chicago, IL, Nov. 1994.

Millman, P.A., Stanley, M. and Colgate, E.J. "Design of a High Performance Interface to Virtual Environments," 1993 IEEE Annual Virtual Reality International Symposium, Seattle, WA, 1993.

Brooks, T.L. "Telerobotic Response Requirements," Proceedings of the IEEE International Conference on Systems, Man, and Cybernetics, Los Angeles, CA, Nov., 113–120, 1990.

Jacobus, H.N., Riggs, A.J., Jacobus, C.J. and Weinstein, Y., "Implementations Issues for Telerobotics Handcontrollers: Human–Robot Ergonomics," pp. 284–314 in M. Rahimi and W. Karwowski. eds., *Human–Robot Interactions,* New York, Taylor & Francis, 1992.

Iwata, H., Nakagawa, T. and Nakashima, T., "Force Display for Presentation of Rigidity and Virtual Objects," Journal of Robotics and Mechatronics 4(1):39–42.

Durlach, Nathaniel I. and Mavor, Anne S., Editors. *Virtual Reality: Scientific and Technological Challenges.* National Academy Press, Washington DC, 1995. pp. 161–230.

*Primary Examiner*—Paul Ip
*Attorney, Agent, or Firm*—Gifford,Krass,Groh,Sprinkle, Patmore,Anderson & Citkowski

[57] ABSTRACT

A virtual-reality system provides a full-body, digitally programmed, kinesthetic display in the form of a foot-haptic system incorporating a pair of footpads, one associated with each foot of a user, and a multi-axis electromechanical interface responsive to user position and orientation. A computer, in communication with the electromechanical interface, permits the user to interact with a virtual terrain, vertical features, or other users. In a preferred physical realization, the system includes three major components: a locomotion simulator, a ground plane 104, and a vertical feature emulator. A head-mounted display provides all visual clues. The system may be operated in a first mode of operation, wherein the user's feet and the footpads remain in constant contact with each other, or an alternative mode of operation, wherein the user makes and breaks contact with the footpads in a cyclical manner.

20 Claims, 2 Drawing Sheets

WHOLE-BODY KINESTHETIC DISPLAY

REFERENCE TO RELATED APPLICATIONS

This application claims priority of U.S. provisional application Ser. No. 60/021,151, filed Jul. 1, 1996, and co-pending application Ser. No. 08/854,375, filed May 12, 1997, which is a continuation of application Ser. No. 08/543,606, filed Oct. 16, 1995, now U.S. Pat. No. 5,629,594, issued May 13, 1997, which is a continuation-in-part of application Ser. No. 08/257,070, filed Jun. 9, 1994, now U.S. Pat. No. 5,459,382, issued Oct. 17, 1995, which is a divisional of application Ser. No. 07/984,324, filed Dec. 2, 1992, now U.S. Pat. No. 5,389,865, issued Feb. 14, 1995.

FIELD OF THE INVENTION

This invention relates generally to locomotion simulation and, in particular, to a foot-haptic implementation of such a device.

BACKGROUND OF THE INVENTION

The basic function of a locomotion simulation device is to apply forces to an operator's body without having the body move. This allows the system to present the illusion of motion activities while maintaining a net body acceleration of zero. Another function is to take energy out of the operator This should be done in a manner that extracts a realistic amount of energy (as compared to performing the task in a real, as opposed to a virtual, environment). For training applications, there is an additional requirement that the activity is performed so as to realize positive training transfer. A preferred implementation might also include the following activities: moving naturally, moving across large areas, simulating ground features, simulating terrain features, climbing stairs, moving with assured safety, assuming alternative postures, climbing over/through obstacles, manipulating gear and interacting with vertical features.

Given these sets of requirements, there exists three categories of devices that can be employed for locomotion simulation: treadmills, whole-body exoskeletons and foot-haptic devices. The approach described herein is the foot-haptic approach, since the other approaches have significant shortcomings which limit their viability.

The selection analysis presented can be succinctly summarized, as shown in Table 1, below:

TABLE 1

| Type of Device | Ability to Satisfy System Requirement | Ease of Implementation |
| --- | --- | --- |
| Treadmill | Low | High |
| Foot Haptic | Medium | Medium |
| Exoskeleton | High | Low |

Treadmill concepts, for instance, lack the ability to simulate terrain and ground features. Since it is difficult to modulate the surface of the treadmill, they cannot exert a downward force on the soldiers feet, and the presentation of terrain features, such as stairs, is problematical. Treadmills are also not as adept at presenting vertical features to the operator, as compared to the exoskeleton and foot-haptic approaches. The primary reasons for this is that the exact location of the operator is not known precisely, thus increasing the risk of accidentally impacting the operator. Also, the distance the vertical features need to be moved in order to be brought into position is typically large, thus higher speeds would be required to move them into place in a given period of time.

The ability to support on-ground activities, such as crawling and rolling is limited by two factors: the size of the available surface, and safety considerations. The foot-haptic display does not support rolling as well as treadmills because the available surface is somewhat limited. However, since rolling is typically not carried out for an extended period under most conceivable scenarios, this is not a significant limitation. Although treadmills would seem to excel at providing this capability, certain designs are inadequate due to high force and mechanical closing gaps that pose a considerable risk of injury to the operator during on-ground activities.

Certain treadmill concepts are also excessively expensive, while others do not satisfy certain safety criteria, such as minimizing kinetic energies and closing gaps. Other concepts impart unwanted high-speed motion to the operator, possibly causing motion sickness and certainly not modeling reality. Certain treadmill designs require a very large area, on the order of 30 meters in diameter. A number of concepts are also technically unfeasible, due to material limitations, high power requirements, and other factors.

One device that comes close to satisfying the requirements for a whole-body kinesthetic display is a gimbal-mounted exoskeleton. However, such a device cannot be currently manufactured due to certain fundamental limitations (such as motor power to weight ratios) and certain programmatic considerations. For these reasons, no device of this complexity has ever been built and/or controlled). While it may be possible build and control such devices in the future, they would certainly be very costly, due to the high number of actuated degrees of freedom required. There are also safety concerns, since many of the actuators would need to be capable of suspending the mass of the body within the gimbal, which implies that they would be equally capable of exerting sufficient force to injure the operator.

SUMMARY OF THE INVENTION

The present invention is directed toward a virtual-reality system which provides a full-body, digitally programmed, kinesthetic display. In particular, the invention resides in electromechanical apparatus and methods associated with locomotion simulation in the form of a foot-haptic system which provides force feedback in response to a user position and orientation. Broadly, this system includes a pair of footpads, one associated with each foot of a user, and a multi-axis electromechanical interface coupled to each footpad. The interface includes an actuator associated with each axis responsive to user position and orientation, enabling the interface to generate electrical signals representative of footpad position and orientation. A computer, in communication with the electromechanical interface, is programmed to perform the following functions:

store data representative of a visual virtual environment, including a virtual terrain associated with a ground plane, analyze the position and orientation of each footpad relative to the virtual terrain to determine any interaction therebetween, generate at least one force field in response to the interaction, if present, and generate a force signal for each axis of the electromechanical interface as a function of the force field, wherein the actuators are responsive to their respective force signals to provide a force to each axis for creating the force feedback.

In a preferred embodiment, a four-axis motion platform is provided for each foot of an operator. From this base design, kneeling boards may be added to support rolling, kneeling and prone postures, with an optional vertical feature presentation mechanism being appended which allows the operator to interact with realistic walls, windows, doors and other vertical obstacles features in a movement space.

Once in position, a user dons a head mounted display, which is connected to the virtual environment to provides all visual clues. The position and orientation of each footpad is determined by the actions of the user and the virtual environment. The actual modeling of the virtual environment is handled by a control loop which is responsible for modeling the interactions of the operator within the virtual environment. These interactions are driven by position data received from the controller, and outputs force data to the controller, which uses the current position and orientation of the footpads to impart the force received from the virtual environment to the operator. To cause the simulator to appear haptically invisible, the controller also compensates for the inertial loads of the device. In addition, since the operator may not always be in contact with the system, the controller implements an adaptive hybrid position/force control scheme which employs feedback data to update the model parameters.

In a preferred physical realization, the system includes three major components: a locomotion simulator, a ground plane 104, and a vertical feature emulator. The footpads are coupled to a plurality of slides driven by a timing belt which wraps around two pulleys, one of which is actively motor driven, while the other serves as an idler. The system also preferably supports distributed interactive simulation, enabling multiple users to interact with the same terrain, vertical feature, or with one another, without having to be physically co-located.

There are two primary ways in which the foot-haptic system may be employed. In a first mode of operation, the user's feet and the footpads remain in constant contact with each other. To provide a controllable method for attaching and detaching from the footpads, computer-controlled electromagnets are preferably employed.

According to the second mode of operation, the user makes and breaks contact with the footpads in a cyclical manner, with the footpads automatically moving to the location where a user's foot is predicted to intersect with the terrain. In this case, the control system determines user status, and predicts where the user's foot is moving. It then predicts the intersection of the user's foot with the virtual terrain, and moves a footpad to that location. In a preferred implementation of this embodiment, an inverse kinematic solution is used to move the sliders along respective linear rails such that the footpad will be in the proper location in Cartesian space.

DETAILED DESCRIPTION OF THE INVENTION

This invention relates generally to locomotion simulation and, in particular, to a full-body, digitally programmed, kinesthetic display for virtual-reality applications. More particularly, the invention is directed toward the electromechanical system design for a foot-haptic device or "display." It was determined that the foot-haptic display represents a reasonable compromise in terms of capabilities and technical feasibility. The only major shortcoming with this concept is the limited area for rolling, but as previously noted, under realistic training scenarios, only limited rolling needs to be supported, and the foot haptic device does provide this capability. In addition, the foot-haptic display (and the theoretical exoskeleton) are the only devices that permit realistic modeling of the foot/terrain interaction, which is one of the most critical features for such a device. The foot-haptic display also provides the best emulation of vertical features because the safety issues about moving the features into place are mitigated due to the precise knowledge of the user's stance at all times.

The mass of the moving parts of the foot-haptic display are about the same as that of the human operator. Thus the kinetic energy of those parts of the mechanism that are in close proximity to the operator are not potentially harmful. As a counter-example, the moving mass for a moving-surface device (a type of two-dimensional treadmill) may be on the order of one ton. Operating at full speed, such a device has as much kinetic energy as an automobile.

According to the inventive concepts disclosed herein, the use of position and force sensors at all points of contact between the foot-haptic device and the operator allow the determination the operator's pose at all times. By knowing the operator's mass, these sensors can be monitored to ensure that the operator is always in proper contact with the device. Should the operator move into an unsafe position, these monitors detect the anomaly and shut the system down, thereby preventing the operator from becoming injured.

Figure 1:
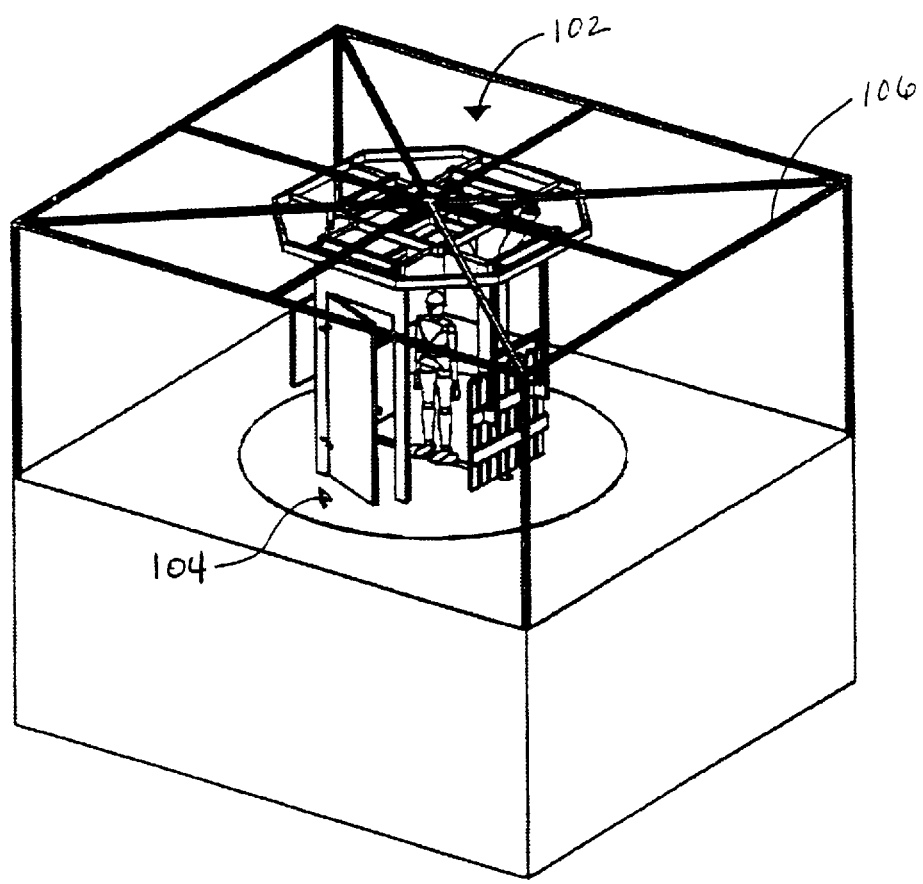
FIG. 1 is an overview of a locomotion simulator according to the invention as seen from an oblique perspective.

A drawing of a foot-haptic locomotion simulator according to the invention is shown in FIG. 1. This figure identifies three major components of the device: a locomotion simulator 102, a ground plane 104, and a vertical feature emulator 106. A description of how the device is normally used will now be presented, followed by a discussion of the functionality of each of the three major components.

Device Utilization

The invention may be used for a variety of tasks, including location-based entertainment, training of dismounted operators, indoor track and field training, training in eye-hand-body coordination sports, training systems for civilian safety and police personnel and VR-based rehabilitation systems. The range of scenarios that can be emulated vary widely, however, the basic mode of operation of the foot-haptic device is the same. In this section, the operation of the foot-haptic device is described with respect to a generic group training application.

Each person undergoing training is assigned to a foot-haptic device. Since, in a preferred embodiment, the foot-haptic device supports distributed interactive simulation (DIS), it is not necessary that all of the trainees be co-located. Accordingly, this DIS capability allows for far greater flexibility than would a stand-alone device. In addition to the trainee, there may be additional personnel assigned to service the devices, performing tasks such as ensuring that the vertical feature set matches the simulation's requirements, presenting objects to the users, and so forth.

Figure 2:
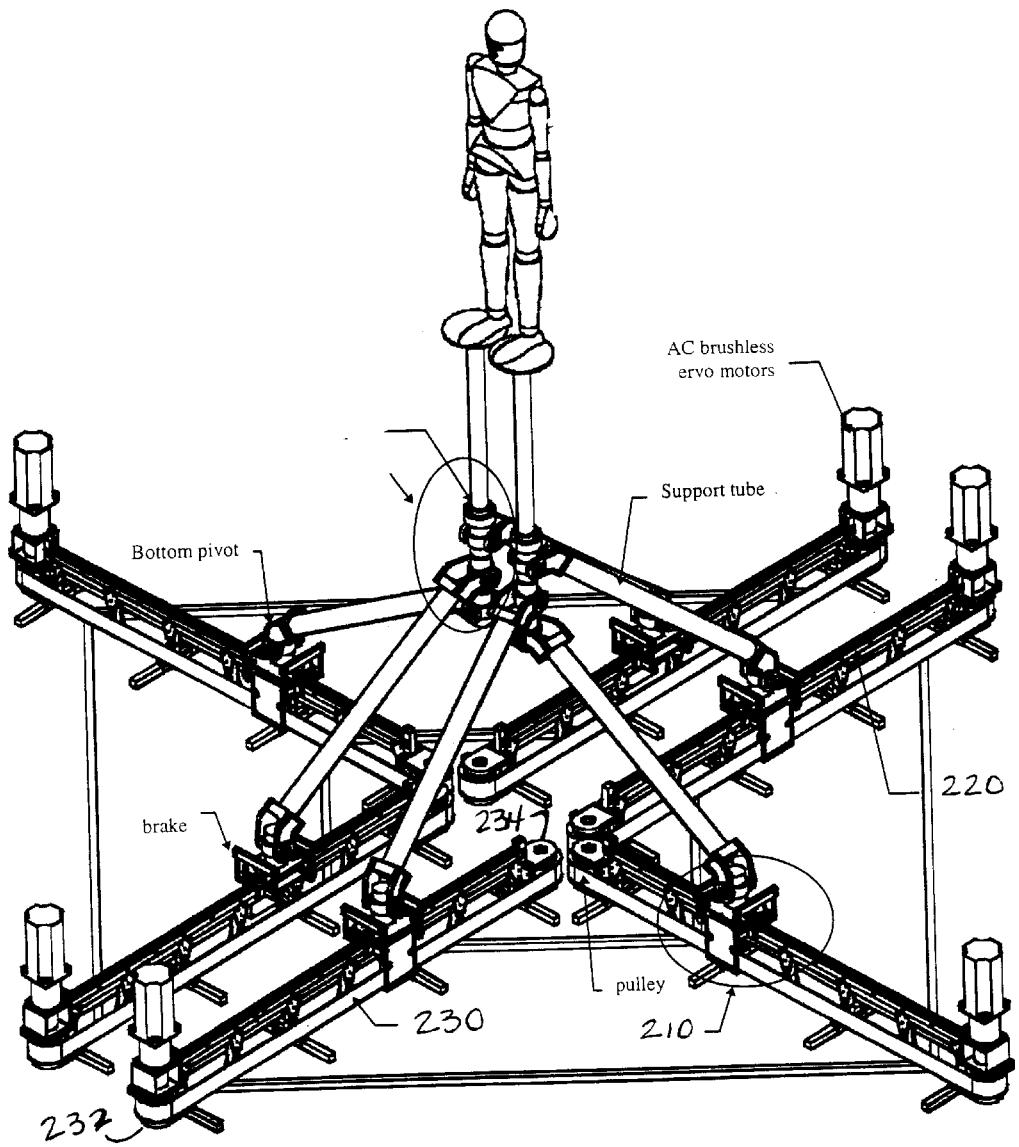
FIG. 2 is an oblique representation of electromechanical aspects associated with a foot-haptic embodiment of the locomotion simulator.

At the beginning of each training exercise, the operator 202 positions himself on the device by using a short ladder to step up to the footpads 204, as shown in FIG. 2. Once in position, the operator dons a head mounted display (HMD), which is connected to the virtual environment and provides all visual clues to the operator. Since the operator wears a safety harness, the need for a wireless connection to the HMD is obviated. To provide position information of the operator and any accouterments, a wireless tracking system is preferably employed.

Before commencing the training scenario, a brief (5–15 minute) period of time is allotted to allow the operator to become accustomed to the device. This is important for two related reasons. First, the human vestibular system, which has evolved over a long period of time for operating in a real environment, is very sensitive to changes in operating conditions. The vestibular system is easily trained to operate in other-than-normal conditions, but this training takes time. Thus, it is better to devise simple exercises for quickly retraining the vestibular system before commencing the scenario than immediately launching into the scenario. Second, when people walk, there is a momentum vector associated with that motion. This vector is located at the individual's center of gravity, and its magnitude is equal to mass times speed. When using any training device that requires one to walk in place, this momentum vector is no longer present. Walking without this momentum requires practice, and this practice should take place outside the training scenario.

There are two primary ways in which the foot-haptic device can be employed. With the first, the operator's feet and the footpads remain in constant contact with each other. With the second, the footpads move to the location where the operator's foot is predicted to intersect the terrain. Each mode of operation will be described.

Footpads Move With the Feet

During normal operation, the operator remains in constant contact with the footpads. This allows continual measurement of contact forces, which is important for the assured safety of the operator. To perform activities that require the operator to disengage from the foot pads, an override command is issued to prevent the system from halting. Note that under normal operation, loss of contact signals an anomalous condition, causing the simulator to halt so as not to injure its operator.

From the operator's perspective, the foot haptic device will appear to be invisible. The operator will perform all activities in a normal manner, with the device acting on the operator in such a manner as to simulate the virtual environment. Thus, from an observer's perspective, the foot-haptic device will appear to be slaved to the operator. When the operator raises his foot, the foot pad follows. When the operator lowers his foot, the foot pad follows passively until some point at which it simulates the terrain by becoming rigid.

The advantages of this approach include a high degree of knowledge of the operator's position and a relatively simply control paradigm. The primary disadvantage of this method is the electrical power needed to maintain continual contact with the foot. Consider the simple case of jumping—the center of gravity of the operator's body accelerates smoothly but the feet are jerked off the ground with very high acceleration. For a mechanism to follow such activity requires extremely high instantaneous power.

Footpads Instantiate the Virtual Terrain

During normal operation according to this embodiment, the operator makes and breaks contact with the footpads in a cyclical manner. The control for this method is more complex because two control modalities are required. When the foot is in contact with the footpad, the control mode is similar to the method just described. However, when the foot is recovering, the footpad must move to that point in the world where the foot will be when its predicted motion has it intersecting the virtual world.

As with the previous method, the operator will not be aware of the foot-haptic device. The primary advantage of this method is the simplified hardware requirements due to the reduced acceleration profiles. The disadvantage is the increased complexity of the control system.

In operation, the position of the footpad 204 is determined by the actions of the operator 202 and the virtual environment. The control system determines the current operator state, and predicts where the operator's foot is moving. It then predicts the intersection of the operator's foot with the virtual terrain and moves a footpad to that location. For the footpad to move, an inverse kinematic solution for the device is solved, which allows the controller to move sliders 210 to a position along the linear rail 220 such that the foot pad will be in the proper location in Cartesian space. The slides 210 are driven by a timing belt 230 which wraps around two pulleys, one which (232) is driven by the motor, while the other (234) is an idler. Not shown in FIG. 2 are the multiple redundant safety systems.

Component Functionality

A device to meet the requirements for a wide variety of application areas must possess several key features, including the ability to traverse a variety of terrains types and terrain features over extended distances; the ability to support a variety of body poses, including walking, kneeling, crawling, etc., and the ability to simulate and interact with vertical features. To meet these requirements, the preferred embodiment of this invention incorporates three separate component devices: (1) the haptic footpads, (2) a set of auxiliary pads, and (3) a vertical feature emulation system.

Although theoretically technically feasible to combine all of the required functionality into a single, monolithic device, the use of three components offers several advantages, including:

Simplified design—since each component can be designed independently of the others (with some restrictions), the design task is greatly simplified.

Reduced risk—each component can be built and tested independently of the others, thereby minimizing the impact on the other components should a problem develop.

Simplified integration—since each component is mechanically distinct from the other, their motions are coordinated via software, which not only simplifies system integration, but also increases system flexibility and capability.

Reduced cost—as the completed mechanism is comprised of two identical locomotion simulators and two identical auxiliary pads, the number of distinct components to be developed is minimized.

With regard to operator safety, numerous sensors have been incorporated into the design to maximize knowledge of the operator's pose at all times. For example, the vertical feature emulator includes a window object. For training purposes, it may be necessary to allow the window to shut while a operator is climbing through it. In the real world, a window shutting on a person's fingers could cause significant damage, but since the virtual window is instrumented, it will only apply a limited force, and no more. This type of safety feature is preferably incorporated into all mechanical closing gaps.

Haptic Footpads

The purpose of the haptic footpads is to emulate the widest possible range of interactions between the operators feet and the underlying terrain. Some examples include the emulation of walking on pavement, sand, or in mud; climbing slopes or stairs, and providing the capability for crawling.

There are several key features of the haptic footpads that provide it with the necessary capabilities to carry out these tasks. These features include the use of components that permit high-bandwidth response, footpads that can be coupled to the operator is shoes, and an advanced control system that makes the use of the device transparent.

The need to support high-bandwidth response is derived from the proprioceptive and biomotive capabilities of the human operators. Humans can:

detect large-scale motions with a frequency as high as 30 Hz
accelerate from rest to almost 20 mph in less than two seconds
realize a range of motion that is approximately 5 feet vertically, 4 feet longitudinally and transversely.

To provide a realistic training environment, the locomotion emulator must be capable of mirroring such human motion. At the same time, the simulator must be capable of supporting both the operator's weight and its own weight.

To simulate many types of terrain features, the forces on the feet are directed upward, normal to the points of contact with the underlying terrain. For example, when walking on a smooth surface, the reaction force is directed vertically upward. When walking on medium sized boulders, the reaction force is normal to the surface of the boulder on which the foot is currently placed. In both of these examples, the net force is being applied to the bottom of the foot. Were all terrains contacts of this type, it would not be necessary to couple the operator's feet to the locomotion simulator.

However, all ground contacts are not of this type. Consider walking through mud or snow. In these situations, a downward force is applied to the feet as a person moves. To apply a downward force on the feet of a person using the simulator, the device must either push down on the top of the foot or it must provide a means of coupling the foot to the footpad. Since the application of forces to the top of the foot is not normally experienced, the latter approach is preferred. It also has the added advantage of being inherently safe.

To provide a controllable method for attaching and detaching from the footpads, a means for changing the state of the attachment without operator direct physical intervention is required. Two methods were explored for performing this function: computer-controlled pneumatic suction cups and electromagnets. Of the two approaches, the electromagnet approach is preferred for several reasons. First, its response time is faster. It is also easier to implement and, it is less affected by contaminants that may be on the operator's feet. The only drawback to the electromagnet approach is the need for special boots with embedded soft iron plates.

The control scheme for the locomotion simulator preferably incorporates several key features, including incorporation of the virtual environment, position/force control modes and inertia compensation. To satisfy these goals, the control structures described in co-pending U.S. patent application Ser. No. 08/513,488 were employed. Accordingly, the subject matter of this application is incorporated herein by reference in its entirety.

Virtual environment modeling is handled by an outer control loop which runs at approximately 30 Hz, and is responsible for modeling the interactions of the operator within the virtual environment. These interactions are driven by position data received from the controller, and outputs force data to the controller, which uses the current position and orientation of the locomotion simulator to impart the force received from the virtual environment to the operator.

To cause the simulator to appear haptically invisible, the controller also compensates for the inertial loads of the device. Since the operator is not always in contact with the device, thereby requiring position control as opposed to force control, the controller implements hybrid position/force control in the world Cartesian frame. Such hybrid position/force control has been shown to provide the most general means of controlling a robot manipulator, since position control, force control and inertia compensation are all encompassed within a single unifying framework. To further improve the performance of this control system, an adaptive hybrid position/force control scheme has been developed and implemented which employs feedback data to update the model parameters. It is this adaptive control strategy that is employed for the foot-haptic device.

Ground Plane

The ground plane serves two critical roles. First, it provides a platform on which the operator can kneel, crawl and/or roll; and secondly, it provides an emergency net for the operator should he lose balance during an exercise and fall. To accomplish these goals, the ground plane must:

Allow the smallest possible opening in the ground plane (for safety reasons) while still permitting the foot haptic devices to move through their full range of motion.

Be sufficiently large to allow on-ground activities. To be effective, the auxiliary pads must be large enough to allow a operator to perform some limited number of rolls and other on-ground maneuvers. Although the foot haptic device is not intended to be a physical training device, certain on-ground activities are required for meaningful training exercise for certain applications.

Permit in-place crawling. As operators may need to crawl during a training exercise, the foot haptic device must support this activity. To crawl in-place requires that the feet move but the upper body does not. To accomplish this, the ground plane surface must have a relatively low coefficient of friction so as to allow this activity. The operator's feet will remain attached to the foot pads for this activity.

Be sufficiently strong to bear the full weight of a fully encumbered operator.

Vertical Feature Emulator

Unlike open terrains, in which the operator infrequently comes into contact with vertical features (such as trees), in other environments (such as urban terrains), the operator's activities are heavily influenced both by the vertical features present and his ability to interact with them. Thus, to provide a realistic environment for these environments, the incorporation of vertical features is a necessity. However, vertical features pose a great challenge for simulation because of the need to move these features within the workspace of the operator, thereby creating a potential safety hazard. The inventive foot-haptic device reduces this hazard by restricting the position of the operator's body to fall within a small, well-delineated region. This reduces the distance over which the vertical features have to be displaced in moving them into their required location(s), thus reducing the speed at which they move and the impact they could impart to a operator.

A vertical feature emulator should also be able to present a variety of features to the operator. This can be accomplished by creating a complex mechanism that holds a large number of features, or by creating a simple mechanism that holds a smaller number of replaceable features. The latter approach was pursued for several reasons, including Since the number of potential features is so large, a mechanism that would be capable of presenting all of these features to the operator would be very complex, costly and may require large motions of the features, thereby negating the safety benefit of the foot haptic device, vis-a-vis vertical features.

Since the types of features to be encountered is likely to change from scenario to scenario, the ability to change features is probably a requirement regardless of the approach taken.

The use of automated self identification schemes, such as bar coding, ensures that the appropriate feature is placed on the presentation device and that the controller is automatically made aware of the presence and type of each of the features.

As the operator moves about in the virtual environment, certain vertical objects will be encountered. At some point, those objects are close enough for the operator to interact with them. At that time, the computer commands the appropriate feature to move into location with respect to the operator. This allows the operator to interact with those features that form a part of his virtual environment. The vertical features need not be simple static devices. For example, since doors and windows play an important role in many training scenarios, the operator must be able to interact with these features in a realistic manner.

The foot-haptic device also allows operator to employ standard accouterments, such as weapons, backpacks, tools, etc. To be incorporated into the simulation, the location of these objects are preferably entered into the simulation. Objects can be set on the ground and retrieved later by having the person servicing the device pick up and replace these objects at the required times.

Commercial Applications

Visual and audio virtual reality technologies have been used in numerous applications, ranging from mental health therapy, to entertainment, to military training. While these technologies provide realistic immersive environments, these environments lack one fundamental component: the sense of touch. The fully-body kinesthetic display described herein creates the sense of touch normally generated through ground interactions. Completely immersive locomotion experiences, such as those enabled by the described technology, will open up a whole new class of applications, including:

Training: If execution of a task requires locomotion, the task can be trained using the full body kinesthetic display. Examples include athletic, military, and police training.

Rehabilitation: Because the full body kinesthetic display device is completely programmable, it can be used to enhance or resist movement of the user's legs.

Control: The full body kinesthetic display device can be used in a teleoperation mode to control remote devices. For example, an operator using the kinesthetic display can control a walking robot and have an accurate, intuitive display of the physical forces acting on the remote vehicle.

Entertainment: Games are becoming increasingly immersive. By allowing users to realistically walk, run, or crawl through entertainment environments, the described technology will significantly increases the level of immersion and interaction possible in LBE and coin-operated games.

That claimed is:

1. A foot-haptic system for providing force feedback in response to a user position and orientation, the system comprising:
    a pair of footpads, one associated with each foot of a user;
    a multi-axis electromechanical interface coupled to each footpad, the interface including an actuator for each axis responsive to user position and orientation, enabling the interface to generate electrical signals representative of the position and orientation of each footpad in three-dimensional space; and
    a computer in operative communication with the electromechanical interface, the computer being programmed to perform the following functions:
        store data representative of a visual virtual reality, including a virtual terrain associated with a ground plane,
        analyze the position and orientation of each footpad relative to the virtual terrain to determine any interaction therebetween,
        generate at least one force field in response to the interaction, if present, and
        generate a force signal for each axis of the electromechanical interface as a function of the force field, wherein the actuators are responsive to their respective force signals to provide a force to each axis for creating the force feedback.

2. The foot-haptic system of claim 1, wherein the electromechanical interface is operable along at least four axes.

3. The foot-haptic system of claim 1, wherein the electromechanical interface further includes:
    a set of rails associated with each footpad, each rail including a linear slider; and
    a support tube from each slider to its respective footpad.

4. The foot-haptic system of claim 3, wherein the rails associated with each footpad are orthogonal to one another.

5. The foot-haptic system of claim 3, wherein three rails are associated with each footpad to provide a yaw axis in addition with movements in three-space.

6. The foot-haptic system of claim 1, further including means for ensuring that the user's feet remain in contact with the footpads.

7. The foot-haptic system of claim 6, wherein the means for ensuring that the user's feet remain in contact with the footpads includes a electromagnetic supported in each footpad adapted to attract a magnetic boot worn by the user.

8. The foot-haptic system of claim 1, wherein the user's feet do not need to remain in contact with the footpads at all times, and wherein the computer is further programmed to solve an inverse kinematic solution to predict the location of each footpad based upon the position and orientation of the user.

9. The foot-haptic system of claim 1, further including a ground-plane simulator.

10. The foot-haptic system of claim 1, further including a vertical feature emulator in operative communication with the computer, enabling the user to sense and interact with virtual objects above the virtual terrain.

11. A method of providing force feedback in response to a user position and orientation, the method comprising the steps of:
    providing a pair of moveable footpads upon which the user stands;
    computer simulating a virtual environment including a virtual three-dimensional terrain;
    sensing the movement of the user through the footpads;
    analyzing the position and orientation of each footpad relative to the virtual terrain to determine any interaction therebetween;
    generating at least one force field in response to the interaction, if present; and
    generating a force signal as a function of the force field so as to provide a haptic force feedback to each footpad.

12. The foot-haptic system of claim 11, wherein the step of providing a pair of moveable footpads includes providing footpads operable along at least four axes.

13. The foot-haptic system of claim 11, further including the steps of:

provideing an electromechanical interface having a set of rails associated with each footpad, each rail including a linear slider and a support tube from each slider to its respective footpad; and translating the sliders so move the footpads in three dimensions in conjunction with the steps of generating the force signals and the feedback.

14. The foot-haptic system of claim 13, wherein the rails are positioned orthogonal to one another.

15. The foot-haptic system of claim 11, further including the step of providing a yaw axis.

16. The foot-haptic system of claim 11, further including the step of positively coupling the user's feet to each footpad.

17. The foot-haptic system of claim 16, wherein the step of positively coupling the user's feet to each footpad includes the use of electromagnetism.

18. The foot-haptic system of claim 11, wherein the user's feet do not need to remain in contact with the footpads at all times, and wherein the method further includes the steps of:

solving an inverse kinematic solution to predict the location of each footpad based upon the position and orientation of the user.

19. The foot-haptic system of claim 11, further including the step of simulating a ground plane.

20. The foot-haptic system of claim 11, further including the step of emulating a vertical feature enabling the user to sense and interact with virtual objects above the virtual terrain.

* * * * *